United States Patent Office 3,425,964
Patented Feb. 4, 1969

3,425,964
LATENT CURING AGENTS FOR THERMOSETTING POLYMERS
Henry Stanley, Cedar Grove, N.J., assignor to National Starch and Chemical Corporation, New York, N.Y., a corporation of Delaware
No Drawing. Continuation-in-part of application Ser. No. 103,703, Apr. 18, 1961. This application Oct. 9, 1964, Ser. No. 402,957
U.S. Cl. 260—2.5                 4 Claims
Int. Cl. C08g 53/10

ABSTRACT OF THE DISCLOSURE

The invention relates to a process of adding a latent curing agent made from the reaction of carbon dioxide and water with a liquid polyfunctional amine to a thermosetting resin and heating to cure and foam the resin.

---

The present invention is a continuation-in-part of my copending application, Ser. No. 103,703, filed on Apr. 18, 1961, now abandoned.

It is the object of this invention to provide novel latent curing agents characterized by the ease and simplicity of both their preparation and subsequent usage. More particuuarly, it is the object of this invention to provide latent curing agents for use with various thermosetting polymers, said curing agents being free from many of the disadvantages which are found in presently employed materials including their limited stability, and their toxicity. A further object of this invention involves the preparation of latent curing agents which may also function as combination latent foaming/curing agents thereby eliminating the need for separate curing and blowing agents.

As is known in the art, thermosetting polymers are used for the preparation of films, coatings and solid masses which are often crosslinked or set with the aid of so-called curing agents. Among the materials which are employed as curing agents are polyfunctional organic amines. These amines are formulated with the thermosetting polymer and upon the application of heat they effect a cure or crosslinking of the latter by combining with various reactive groups along adjacent polymer chains. Although the use of these organic amines provides fairly adequate results, they are, however, deficient in many respects.

Of prime concern is the fact that when these amines are admixed with a thermosetting resin, the stability of the resulting formulation is, in most cases, rather limited since the amines proceed to crosslink the resin at room temperature even before any external heating is applied. This limited stability often necessitates the immediate use of these formulations so as to prevent their premature curing into a useless gelled or solidified mass. In order to avoid such premature curing, it is necessary to provide two-package systems wherein the amine and resin are packaged separately and are combined only at the point of use. Another problem is the toxicity and corrosiveness of these organic amines, a factor which requires the practitioner to handle these reagents, which are predominantly oily liquids, with extreme care so as to avoid any contact which often leads to serious skin irritations.

The present invention presents a novel method of treating polyfunctional organic amines so as to convert the latter into materials which are entirely free from all of the disadvantages ordinarily associated with curing agents composed of the free amines.

In brief, the process of my invention comprises the use, as curing agents, of the products resulting from the reaction of carbon dioxide and water with liquid, polyfunctional organic amines. As a result of this treatment, these amines are converted into solid, amine-carbonate salts which are capable of being decomposed, upon the application of heat, thereby releasing carbon dioxide and water along with the free amine in its original liquid state.

By employing these solid amine-carbonates for the curing of films and coatings derived from thermosetting polymers, it is found that the many limitations on the use of the free amines have, in fact, been eliminated. Thus, the problem of stability no longer exists as the amine-carbonates are completely stable and cannot initiate the crosslinking of the polymer until the amine-carbonate which is, in effect, a latent curing agent, is activated or decomposed by the application of heat. This inherent stability eliminates the need for two-package systems since the resin formulations containing my amine-carbonate latent curing agents can be packaged in single units without the danger of any premature curing taking place. The toxicity problem is also avoided since the amine-carbonates are easily handled, relatively innocuous powders in contrast to the highly irritating liquid state of the free amines from which they are derived.

A surprising advantage in the use of my amine-carbonate curing agents resides in the fact that they may also be employed as combination latent foaming/curing agents for the simultaneous curing and foaming of solid masses of thermosetting resins. Heretofore, the foaming of thermosetting resin masses has been accomplished by the use of a so-called blowing agent which was added to the resin prior to its curing. Thus, in order to foam a resin it was necessary to provide both a curing agent and a foaming or blowing agent. In contrast, my amine-carbonates combine both of these functions when they are employed for the curing of substantial masses of thermosetting resins.

This foaming action occurs when the amine-carbonates are heated whereby the carbon dioxide and water which are released upon their decomposition are trapped within the mass of the thermosetting resin which is, of course, simultaneously curing as a result of the crosslinking activity of the liberated free amine. It should be noted, however, that this foaming function is limited to masses of thermosetting resins having a thickness greater than 3 mils. Likewise, it can be similarly noted at this point that the use of my amine-carbonates as simple curing agents is, conversely, limited to films, coatings or laminations of thermosetting resins having a thickness no greater than 3 mils. At thicknesses greater than 3 mils, foaming will also occur since, as noted above, the liberated carbon dioxide and water are not able to escape from within the body of the curing resin mass. This foaming action may be accelerated by the addition, to the resin formulation, of a conventional blowing agent such as ammonium carbonate.

The polyfunctional organic amines which are applicable for conversion to the latent curing agents of my invention may be described as alkyl and substituted alkyl amines having even numbers of primary and/or secondary amine groups. Examples of specific amines coming within this description include ethylene diamine; triethylene tetramine; 1,3-propane diamine; acetyl triethylene tetramine; hydroxydiamine propane; hexamethylene diamine; 1,4-butane diamine; 1,5-pentane diamine; 1,6-hexane diamine; trimethylene diamine; N,N'-dimethyl-2-butene-1, 4-diamine; m-xylene diamine; 1,2-propane diamine; methylamino diamine; ethylamino diamine; menthane diamine; 1,2-propane diamine; p-chlorophenyl ethylene diamine; propylamino diamine; N,N'-diethyl ethylenediamine; N,N'-dimethyl ethylenediamine; N,N'-dipropyl ethylenediamine; and methylene diamine.

As can be seen from the above listing of amines, the polyfunctional organic amines applicable for use in the process of this invention are either primary or secondary alkyl amines having either two or four amine groups upon their respective molecules. Thus, these applicable amines may be described as primary or secondary alkyl amines having a total of $n$ amine groups upon their respective molecules, wherein $n$ is an integer divisible by 2 and having a maximum value of 4.

The preparation of my amine-carbonate latent curing agents may be accomplished by dissolving the amine along with some water in a solvent in which the resulting amine-carbonate salt will be insoluble. Applicable solvents include acetone, methanol, benzene, ethanol, isopropanol, n-butanol, methyl ethyl ketone, ethyl acetate, and isopropanol. Carbon dioxide in gaseous form may then be bubbled through the solution of the amine or, if desired, the carbon dioxide may be introduced in the form of a solid, (i.e., "Dry Ice"), small pieces of which are added during the course of the reaction. In either case, an excess of carbon dioxide should be employed so as to provide for the in situ generation of carbonic acid as a result of the reaction of the carbon dioxide with the water which is present in the solution. The carbonic acid, in turn, proceeds to react with the amine so as to produce the desired amine-carbonate salt which precipitates out during the course of the reaction. The resulting amine-carbonates may then be filtered, washed with additional solvent, allowed to air dry, and ground to the desired mesh size.

In using these amine-carbonate salts as latent curing agents or as combination latent foaming/curing agents, they may be formulated with thermosetting resins of the following types: polychloroprene; phenol-formaldehyde; polyurethane, i.e., resins which are reaction products of organic diisocyanates, with a polyhydroxy compound such as an ether glycol, an ether triol, an ester of a polyhydric alcohol, or a similar polyhydroxy compound containing at least two active hydrogen atoms, that is hydrogen atoms which can be replaced with sodium; and, epoxy type, said epoxy resins being the reaction products of epichlorohydrin with bisphenol A, i.e., bis-(4-hydroxyphenyl)-2,2-propane.

The resulting formulations may be in the form of organic solvent dispersions. In those cases where the resin which is employed exists in the form of viscous liquid or syrup, formulations may be prepared by simply dispersing the amine-carbonate within the resin. With respect to proportions, it will be necessary to employ only that concentration of amine-carbonate which will liberate the proper amount of free amine required for the curing of a particular thermosetting resin. Since the type of amine used for the preparation of the amine-carbonate salt as well as the type of thermosetting resin with which it is to be formulated will both determine the amount of free amine which is needed, the correct concentration of amine-carbonate which is necessary for a particular formulation may be readily ascertained. In general, however, one may use from 2% to 30%, by weight, of amine-carbonate as based upon the total weight of thermosetting resin present in the formulation.

The curing cycle of the films, coatings or laminations derived from formulations containing my amine-carbonate latent curing agents, may be readily varied as desired by the practitioner. Thus, one may employ different amine-carbonates in order to obtain products which will cure in a fixed time but at varying temperatures. Or, by varying the temperature of the curing cycle, one may vary the time required for the curing of a formulation containing any given amine-carbonate. The factor which directly determines the curing cycle of a resin formulation containing one of my amine-carbonate latent curing agents, is the temperature at which the respective amine-carbonate decomposes to liberate the free amine. Their rate of decomposition is directly proportional to the temperature to which they are exposed. In general, these materials decompose within 2 minutes at 150° C., in ½ to 4 hours at 75° C., and are stable indefinitely at 25° C. (i.e., room temperature). The ability to vary both the amine-carbonate as well as the curing cycle for the amine-carbonate, gives the practitioner an unusual degree of versatility in being able to prepare specific formulations for any particular requirement.

It should be noted that one may introduce any type of additive whose presence may be desired into the resin formulations containing my amine-carbonate latent curing agents. These additives may include such materials as inert mineral fillers, pigments, waxes, buffers, non-reactive polymers, emulsifiers, surfactants, additional curing agents or foaming agents, antioxidants, diluents, and leveling agents. In all cases these thermosetting resin formulations can be produced in one-package units without the danger of any premature curing taking place.

As noted earlier, these resin formulations may be prepared in organic solvents or in the liquid resin. Any of these thermosetting resin systems can be employed in the preparation of coatings and films which may, in turn, be used as adhesive binders for a wide variety of substrates. A particularly novel application of these resin systems involves their use as adhesive binders in the manufacture of wood particle board. When the solids content of these formulations is increased and these high solids formulations are then cast in masses having a thickness greater than 3 mils, the latent foaming action of my products will be in effect. These foamed resin masses may be used for the potting or encapsulation of various electronic components or they may simply be used as insulating or cushioning material for construction or packaging applications.

The following examples will further illustrate the embodiment of my invention. In these examples, all parts given are by weight unless otherwise noted.

EXAMPLE I

This example illustrates the preparation of my amine-carbonate latent curing agents.

Into a reaction vessel equipped with means for mechanical agitation, there were introduced 74 parts of 1,3-propane diamine, 18 parts of water and 200 parts of methyl alcohol. Under agitation, small pieces of solid carbon dioxide were added to the amine solution at a rate which allowed for the constant presence of at least one piece of the solid within the solution. The addition of the solid carbon dioxide was continued whereupon it was soon observed that the viscosity of the solution increased and precipitation of the amine carbonate was initiated. After 6 hours, analysis of the solution disclosed that the amine had completely reacted and the reaction was terminated. The precipitate of the 1,3-propane diamine-carbonate was filtered, washed with small quantities of methyl alcohol and allowed to air dry.

In additional repetitions of this procedure, I prepared the amine-carbonate salts of the following amines: ethylene diamine; triethylene tetramine; 1,4-butane diamine; 1,5-pentane diamine, 1,6-hexane diamine; m-xylene diamine; methane diamine; hexamethylene diamine; methylamino diamine; N,N'-dimethyl - 2 - butene-1,4-diamine; and 1,2-propane diamine.

The above procedure was also repeated with the exception, in this instance, that gaseous carbon dioxide was employed in place of the solid gas. This alternate method required external cooling of the reaction vessel with a cold water bath and the total reaction period was eight hours.

EXAMPLE II

This example illustrates the actual use of my amine-carbonate latent curing agents in the curing of epoxy resin coatings. It also points out the stability of resin formulations containing these amine-carbonates in contrast to formulations which are cured with a comparable free amine.

A film forming formulation was prepared by intimately dispersing 9.7 parts of triethylene tetramine-carbonate, as prepared by means of the procedure described in Example I, in 100 parts of a liquid epoxy resin. The latter resin had an epoxide equivalent of 175–210; a Gardner-Holdt viscosity, at 25° C., of 5,000–15,000 centipoises; an average molecular weight of 350–400; and, was prepared by the reaction of epichlorohydrin and bisphenol A, i.e., bis-(4-hydroxyphenyl)-2,2-propane. A 2 mil thick film of this formulation was then cast upon a steel plate and is was noted that the resulting film did not gel or cure and along with the resin formulation was indefinitely stable at room temperature. To cure this film it was necessary to subject it to a temperature of 150° C. for a 30 minute period, thereby effecting its crosslinking and subsequent hardening.

The above procedure was repeated with the exception, in this instance, that triethylene tetramine was used as the curing agent in place of its carbonate salt. When this formulation was cast into a film, gelation occurred in 45 minutes. In fact, the formulation itself was soon observed to gel and was completely hardened after one-half of room temperature exposure.

EXAMPLE III

This example illustrates the use of my amine-carbonate latent curing agents as a component of a curing system for a polychloroprene synthetic rubber formulation.

The two mixtures from which this formulation was prepared comprised the following ingredients:

Mixture 1

|  | Parts |
|---|---|
| A hard grade of non-sulfur modified polychloroprene rubber stabilized by a thiuram disulfied | 50.0 |
| A sulfur modified polychloroprene rubber stabilized by a thiuram disulfied | 50.0 |
| Sodium acetate | 2.0 |
| Ethylene diamine-carbonate (as prepared by means of the procedure described in Example I) | 2.0 |

Mixture 2

| A 50%, by weight, solution in toluene of an alkylated phenol-formaldehyde resin | 170.0 |
|---|---|
| Toluene | 106.5 |
| Methyl ethyl ketone | 188.0 |
| Hexane | 188.0 |
| A hindered phenol antioxidant | 2.0 |
| A 70%, by weight, dispersion of zinc oxide in toluene | 7.1 |
| A 50%, by weight, dispersion of magnesium oxide in toluene | 8.0 |

The components of the obove described Mixture 1 were milled for 45 minutes in a rubber will with the amine-carbonate being added near the end of this period so as to avoid exposing it to the heat generated during the milling operation. This mixture was then added to Mixture 2 and the resulting formulation was found to be stable, exhibiting no curing or hardening under room temperature conditions. This formulation was successfully employed as an adhesive which was used in the manufacture of wooden furniture.

EXAMPLE IV

This example illustrates the use of my amine-carbonate latent curing agents in a binder system for the preparation of wood particle board.

Green white pine slabs and edgings having an average moisture content of 50–55%, were prepared by passing through a chipping machine, drying to a moisture content of 35%, and by further reduction in hammermills to a particle size such that all of the chips passed through a No. 10 U.S. Standard screen and were retained on a No. 80 U.S. Standard screen. After further drying to a moisture content of 10%, and removal of dust particles, 100 parts of the chips were measured into a blender.

In the blender, the chips were sprayed with 0.75 part of an aqueous emulsion of a water dispersible wax containing 45% solids. There were then added 5 parts of an adhesive binder comprising 70 parts of a liquid epoxy resin having an epoxide equivalent of 190 and a Gardner-Holdt viscosity, at 25° C., of 8,000 centipoises, this resin being derived from the reaction of epichlorohydrin and bisphenol A, i.e., bis-(4-hydroxyphenyl)-2,2-propane; 25 parts of a polyamine curring agent comprising the condensation product of dimerized or trimerized oil fatty acids and ethylene diamine; and, 5 parts of a mixture of 18 parts of triethylene tetramine-carbonate, as prepared by means of the procedure of Example I, which was dispersed in 25 parts of furfural alcohol. After thorough agitation, the thus coated wood particles were deposited onto a metal tray moving on a conveyor belt. The loaded tray then passed through a series of heavy rubber belts thus compacting the particles into a mat.

The tray was next passed onto a weighing platform to assure the desired density of the final board which in this case was to be 45 lbs. per cubic foot. An automatic loading rack was then filled with a load of 15 trays, each bearing the above described mixture. The entire load of 15 trays was then passed into a multi-platen hot press. This press had previously been adjusted so as to give the finished boards a final thickness of ¾ inch. After loading, the press was closed and a pressure of 300 lbs. per square inch applied for a 10 minute period at a temperature of 300° F. The boards were then ejected from the press and were trimmed and sanded.

EXAMPLE V

This example illustrates the use of amine-carbonates as combination latent foaming/curing agents.

A formulation comprising the following ingredients was prepared:

|  | Parts |
|---|---|
| A liquid epoxy resin having an epoxide equavalent of 175–210, a Gardner-Holdt viscosity at 25° C. of 5,000–15,000 centipoises, an average molecular weight of 350–400, and which is prepared by reaction of epichlorophydrin and bisphenol A, i.e., bis-(4-hydroxypheny)-2,2-propane | 100 |
| Toluene | 5 |
| Polyoxyethylene sorbitan monolaurate (a liquid nonionic surfactant) (drops) | 4 |
| Triethylene tetramine-carbonate (as prepared by means of the procedure described in Example I) | 9.7 |

This formulation was cast into the bottom of a rectangular metal mold whose dimensions were 6" x 5" x 2" and the latter was then heated for 30 minutes at a temperature of 120° C. thereby resulting in the preparation of a block of foamed, cured resin having the above described dimensions.

EXAMPLE VI

This example illustrates the use of additional amine-carbonate latent curing agents in the curing of epoxy resin coatings.

Each of the three below described formulations were prepared by dispersing the designated amine-carbonate in the epoxy resin. The resulting formulations were all completely stable under room temperature conditions. A 2 mil film of each of these formulations was then cast on separate steel panels. These coatings were cured by being baked for 30 minutes at a temperature of 150° C. and the final coatings were, in each case, found to be hard, tough, and extremely adherent to their respective panels.

Formulation 1

| | Parts |
|---|---|
| A liquid epoxy resin having an epoxide equivalent of 179–194; a Gardner-Holdt viscosity, at 25° C., of 500–900; and, prepared by the reaction of epichlorohydrin and bisphenol A; i.e., bis-(4-hydroxyphenyl)-2,2-propane | 100 |
| Acetyl triethylene tetramine-carbonate, as prepared by means of the procedure described in Example I | 12 |

Formulation 2

| | Parts |
|---|---|
| A liquid epoxy resin having an epoxide equivalent of 173–179; an average molecular weight of 340–350; a Gardner-Holdt viscosity, at 25° C., of 3,600°–6,400; and prepared by the reaction of epichlorohydrin and bisphenol A. i.e., bis-(4-hydroxyphenyl)-2,2-propane | 100 |
| Hydroxy-diamino propane-carbonate, as prepared by means of the procedure described in Example I | 25 |

Formulation 3

| | Parts |
|---|---|
| A liquid epoxy resin having an epoxide equivalent of 175–210, a Gardner-Holdt viscosity at 25° C. of 5,000–15,000 centipoises, an average molecular weight of 350–400, and which is prepared by the reaction of epichlorohydrin and bisphenol A, i.e., bis-(4-hydroxyphenyl)-2,2-propane | 100 |
| p-Chlorophenyl ethylene diamine-carbonate, as prepared by the procedure of Example I | 30 |

EXAMPLE VII

This example illustrates the use of my amine-carbonate latent curing agents in a coating formulation based upon a polyurethane resin.

In a sealed, moisture free vessel, there were admixed: 100 parts of a polyurethane prepolymer containing 7.8% of residual isocyanate groups which was prepared by the reaction between 38 parts of toluene diisocyanate and 62 parts of dehydrated castor oil; and, 1.5 parts of triethylene tetraamine-carbonate, as prepared by means of the procedure described in Example I, hereinabove.

The resulting mixture was found to be indefinitely stable, exhibiting no curing or hardening under room temperature, i.e., 25° C., conditions. A 1 mil, wet thickness, coating of this formulation was then cast upon an aluminum plate. To cure this coating, it was necessary to subject it to a temperature of 150° C. for a 30 minute period, thereby effecting its crosslinking and subsequent hardening.

Summarizing, the invention is thus seen to provide the practitioner with latent curing agents for use with thermosetting resins which are characterized by their unusual stability and lack of toxicity. Variations may be made in proportions, procedures and materials without departing from the scope of this invention defined by the following claims.

I claim:

1. A thermosetting resin composition comprising a thermosetting resin selected from the class consisting of epoxy resins comprising reaction products of epichlorohydrin with bis-(4-hydroxyphenyl)-2,2-propane; polychloroprene resins; phenol-formaldehyde resins; and polyurethane resins comprising reaction products of an organic diisocyanate with a polyhydroxy compound containing at least two active hydrogen atoms; and, a latent curing agent for said thermosetting resin comprising the product resulting from the reaction of carbon dioxide and water with a liquid, polyfunctional amine; said curing agent being indefinitely stable and resistant to decomposition at 25° C., and being decomposable upon the application of heat so as to yield the free, liquid amine which thereupon effects the cure of said thermosetting resin; wherein said liquid, polyfunctional amine is selected from the group consisting of primary and secondary polyfunctional amines having a total of $n$ amine groups upon their respective molecules, wherein $n$ is an integer divisible by 2 and having a maximum value of 4.

2. The method of curing a thermosetting resin which comprises heating a thermosetting resin selected from the class consisting of epoxy resins comprising reaction products of epichlorohydrin with bis-(4-hydroxyphenyl)-2,2-propane; polychloroprene resins; phenol-formaldehyde resins; and polyurethane resins comprising reaction products of an organic diisocyanate with a polyhydroxy compound containing at least two active hydrogen atoms; in the presence of a latent curing agent for said thermosetting resin which comprises the product resulting from the reaction of carbon dioxide and water with a liquid, polyfunctional amine; said curing agent being indefinitely stable and resistant to decomposition at 25° C. and being decomposable upon the application of heat so as to yield the free, liquid amine which thereupon effects the cure of said thermosetting resin; wherein said liquid, polyfunctional amine is selected from the group consisting of primary and secondary polyfunctional amines having a total of $n$ amine groups upon their respective molecules, wherein $n$ is an integer divisible by 2 and having a maximum value of 4.

3. The method of simultaneously curing and foaming a thermosetting resin mass having a thickness greater than 3 mils which comprises heating a mass of a thermosetting resin having a thickness greater than 3 mils, said thermosetting resin being selected from the class consisting of epoxy resins comprising reaction products of epichlorohydrin with bis-(4-hydroxyphenyl)-2,2-propane; polychloroprene resins; phenol-formaldehyde resins; and polyurethane resins comprising reactions products of an organic diisocyanate with a polyhydroxy compound containing at least two active hydrogen atoms; in the presence of a latent foaming curing agent for said thermosetting resin which comprises the product resulting from the reaction of carbon dioxide and water with a liquid, polyfunctional amine; said foaming/curing agent being indefinitely stable and resistant to decomposition at 25° C. and being decomposable upon the application of heat so as to yield carbon dioxide and the free, liquid amine which thereupon effect the foaming and curing of said thermosetting resin mass.

4. A thermosetting resin composition comprising a thermosetting resin selected from the class consisting of epoxy resins comprising reaction products of epichlorohydrin with bis-(4-hydroxyphenyl)-2,2-propane; polychloroprene resins; phenol-formaldehyde resins; and polyurethane resins comprising reactions products of an organic diisocyanate with a polyhydroxy compound containing at least two active hydrogen atoms; and a latent curing agent admixed therewith comprising a polyfunctional amine-carbonate which is indefinitely stable and resistant to decomposition at 25° C. and being decomposable upon the application of heat so as to effect the curing of the thermosetting resin; the polyfunctional amine moiety of said amine-carbonate being selected from the group consisting of primary and secondary polyfunctional amines having a total of $n$ amine groups upon their respective molecules, wherein $n$ is an integer divisible by 2 and having a maximum value of 4.

References Cited

UNITED STATES PATENTS

| | | | |
|---|---|---|---|
| 2,395,493 | 2/1946 | Miller | 260—92.3 |
| 2,681,901 | 6/1954 | Wiles et al. | 260—47 |
| 2,917,489 | 12/1959 | Gladding | 260—77.5 |
| 3,026,270 | 3/1962 | Robinson | 260—77.5 |
| 2,739,134 | 3/1956 | Parry et al. | |

OTHER REFERENCES

Katchalski et al.: The Chemical Structure of Some Diamine Carbamates, Journal of the American Chemical Society (1951), vol. 73, pp. 1829–1831.

Chemical Abstracts, 43:6157i (1949).

SAMUEL H. BLECH, *Primary Examiner.*

MORTON FOELAK, *Assistant Examiner.*

U.S. Cl. X.R.

260—47, 77.5, 463, 92.3, 59, 75